June 17, 1969  D. J. CRAFT  3,449,953
FLUID FLOW MEASURING EQUIPMENT
Filed June 15, 1966

Patented June 17, 1969

3,449,953
FLUID FLOW MEASURING EQUIPMENT
David J. Craft, Taplow, England, assignor to British Telecommunications Research Limited, Taplow, England, a British company
Filed June 15, 1966, Ser. No. 557,646
Claims priority, application Great Britain, June 18, 1965, 25,921/65
Int. Cl. G01f 1/00
U.S. Cl. 73—204        5 Claims

ABSTRACT OF THE DISCLOSURE

A constant temperature hot-wire anemometer has its hot-wire connected in the output circuit of a low gain amplifier. A fraction of the output signal is supplied via a positive feedback loop to the input of the amplifier, the magnitude of the fraction depending on the electrical resistance and hence on the temperature of the hot-wire. The current required to maintain the hot wire at a temperature such that the loop gain is exactly unity is used as a measure of the cooling effect of fluid flowing past the hot wire and hence as an indication of its flow rate.

---

The present invention relates to fluid flow measuring equipment, particularly of the type in which the desired results are obtained electrically by the use of a heated wire which tends to change its temperature and consequently its resistance or some other electrical parameter due to the flow of fluid thereover. Equipment of this type is already in use and, by analogy with conventional wind measuring equipment, is often known as an anemometer.

The equipment with which the invention is concerned finds useful application in so-called fluid logic systems where it may be desirable to know whether flow of fluid, for instance air under pressure, is taking place or not and it may also be used in connection with the sensing of punched tape. In both these uses the result is generally required on a binary basis, that is to say, it is required to know merely whether fluid flow is taking place or not, and thus the duty is much simpler than in the case of a meteorological anemometer which is designed to record actual wind speed. For the kind of use contemplated it is desirable that the equipment shall have a very rapid response and it has already been found that this result can most readily be obtained if arrangements are made for the detecting wire to operate at a substantially constant temperature with corresponding variations in the amount of heating power required, dependent on the flow of fluid. The chief object of the invention is to simplify and cheapen anemometers of this type while, at the same time, ensuring reliability and consistency of operation.

According to the invention, in a fluid flow measuring device of the type employing a hot wire located in the fluid flow path and composed of material having an electrical parameter which changes with the temperature, the wire is associated with an amplifier arranged to have the gain varied responsive to changes in the said electrical parameter which are produced by fluid flow over the wire, the circuit arrangements being such that when the temperature of the wire is reduced owing to fluid flow thereover the gain of the amplifier is increased to provide additional current through the wire and hence increased heating effect to restore the said electrical parameter to its original value.

Figure 1:
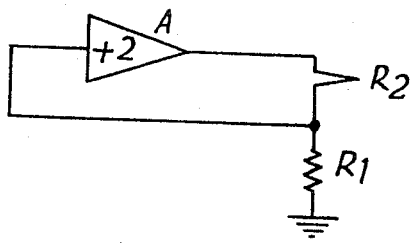
Figure 2:
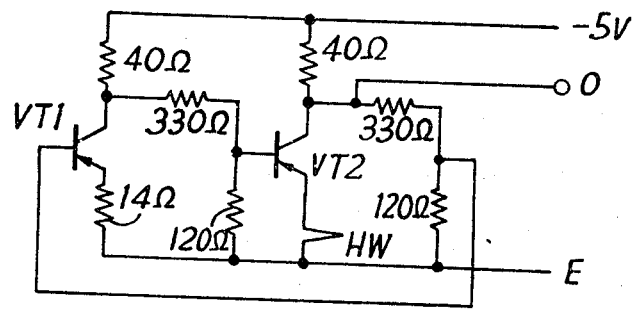
Figure 3:
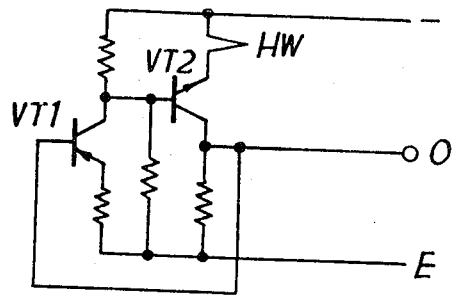

The invention will be better understood from the following description of two methods of carrying it into effect, which should be taken in conjunction with the accompanying drawings comprising FIGURES 1 to 3, of which FIGURE 1 shows the principle of the invention; and
FIGURES 2 and 3 indicate two possible forms of the detailed circuits.

In known hot-wire anemometers the hot wire is generally arranged to form one arm of a bridge circuit with a differential amplifier as the null detector. The output from the differential amplifier is used to provide the bridge drive voltage and it is arranged that the voltage feedback is negative. This arrangement can be made to give satisfactory results but the complete circuitry is quite complicated and therefore expensive and the complete unit occupies appreciable space. This is a disadvantage if it is desired to use the circuits on a multi-channel basis in connection with punched tape readers.

According to FIGURE 1, which shows the basic principle of the invention, use is made of a low-gain amplifier A, for instance as indicated with a gain of 2, in a positive feedback loop. The output of the amplifier is fed back to the input via an attenuator consisting of a linear resistive element R1 and the hot wire probes R2 which is assumed to have a positive temperature coefficient. The gain of the amplifier and the value of R1 are chosen so that when the wire is cold, the loop gain will be greater than unity. When power is first applied to the amplifier, the positive feedback will quickly cause the amplifier to saturate and supply its maximum current to the wire. As the wire heats up, its resistance will rise until the loop gain of the circuit becomes just less than unity. The output from the amplifier then disappears and thus allows the wire to cool. The system will finally stabilise itself with the loop gain exactly unity and the current through the wire at the value which will just maintain unity loop gain. The system quickly attains stability and does not continue to oscillate as there is practically no thermal inertia involved for a directly-heated wire of the dimensions usually involved in work of this type. With a gain of 2 as indicated in FIG. 2, the operating resistance of the wire will be equal to R1.

FIGURE 2 shows a practical circuit employing two transistors of the PNP type, VT1 and VT2. Positive feedback is provided from the collector of VT2 to the base of VT1 and the hot wire HW is included in the emitter circuit of VT2. The output at terminal 0 is taken from the collector of VT2. It will be understood that when fluid flow takes place over the hot wire HW, its temperature is reduced and also its resistance. As a result the collector of VT2 becomes more positive and this change is fed back to the base of VT1. Hence the current passed by VT1 is reduced and the collector becomes more negative, thereby making the base of VT2 more negative. This results in increased current in the emitter circuit of VT2 which provides additional heating of the hot wire HW until its temperature and hence its resistance are restored to the original value. The increased current through the resistor in the collector circuit of VT2 causes the collector to go more positive and this provides the output at terminal 0. This circuit has sufficient symmetry to reduce the effect of drift of transistor characteristics with temperature and has been found to give good results with the values indicated in FIGURE 2.

FIGURE 3 shows a generally similar circuit in which, however, the transistors are of complementary type and this permits some saving of resistors. As before, positive feedback is provided from the collector of VT2 to the base of VT1 and the hot wire HW is included in the emitter circuit of VT2. Also the output at terminal 0 is taken from the collector of VT2. When fluid flow takes place over the hot wire HW, its temperature, and also its resistance, is reduced. Consequently the collector of VT2 becomes more negative and this change is fed back to the base of VT1. Hence the current passed by VT1 is increased and the collector becomes more positive thereby making the base of VT2 more positive. This results in increased current in the emitter circuit of VT2 which provides additional heating of the hot wire until its temperature and hence its resistance are restored to the original value. The increased current through the resistor in the collector circuit of VT2 causes the collector to go more negative and this provides the output voltage at the terminal 0.

The invention accordingly provides a cheaper and simpler form of hot-wire anemometer which is also more compact and thus permits convenient use on a multi-channel basis in connection with a punched tape reader.

I claim:
1. A fluid flow measuring device comprising an electrical conductor for location in the fluid flow path, said electrical conductor being composed of a material having an electrical parameter which changes with temperature, a low gain amplifier having the electrical conductor connected in the output circuit thereof, means for establishing electrical connection with a point in the output circuit at which the voltage is dependent on the current flowing in said conductor, a positive feed-back loop for supplying a feed-back signal to the input of said amplifier, the magnitude of said feed-back signal being dependent on said electrical parameter and being arranged to be such that the gain of the feed-back loop is unity when the electrical conductor is at a predetermined temperature whereby, when the temperature of the electrical conductor is reduced below said predetermined temperature owing to fluid flow thereover, the gain of the amplifier is increased to provide additional heating current through the conductor and hence increase heating effect to restore said electrical parameter to its original value.

2. A fluid flow measuring device comprising an electrical conductor having a positive temperature coefficient for location in the fluid flow path, a low gain amplifier having the electrical conductor connected in the output circuit thereof, output means for establishing electrical connection with a point in the output circuit at which the voltage is dependent on the magnitude of the circuit flowing in the electrical conductor, a positive feed-back loop arranged to provide a feed-back signal the magnitude of which is dependent on the resistance of the electrical conductor and is arranged to be such that the overall gain of the amplifier is unity when the electrical conductor is at a predetermined temperature whereby when the temperature of the conductor is reduced below said predetermined temperature owing to fluid flow thereover, the gain of the amplifier is increased to provide additional current through the wire and hence heating effect to restore the resistance to the previous value.

3. A device as claimed in claim 2 in which the amplifier comprises first and second transistors respectively forming first and second stages of the amplifier, the second transistor having the electrical conductor in the emitter circuit thereof and the feed-back loop being connected between the collector of the second transistor and the base of the first transistor.

4. A device as claimed in claim 3 in which the output is taken from the collector of the second stage transistor.

5. A device as claimed in claim 4 in which the two transistors are of opposite conductivity types to reduce the number of components.

References Cited

UNITED STATES PATENTS

| | | | |
|---|---|---|---|
| 3,236,451 | 2/1966 | Josephs | 73—359 X |
| 3,326,040 | 6/1967 | Walsh | 73—204 |

OTHER REFERENCES

Lumley: "The Constant Temperature Hot-Thermistor Anemometer," Symposium on Measurement in Unsteady Flow, May 21–23, 1962, pp. 75–82.

RICHARD C. QUEISSER, *Primary Examiner.*

EDWARD D. GILHOOLY, *Assistant Examiner.*